United States Patent
Elofsson

[11] Patent Number: 5,846,410
[45] Date of Patent: Dec. 8, 1998

[54] CASSETTE DEVICE

[76] Inventor: Birger Elofsson, Bäverstigen 14, S-731 42 Köping, Sweden

[21] Appl. No.: 592,434
[22] PCT Filed: Jul. 12, 1995
[86] PCT No.: PCT/SE95/00851
§ 371 Date: Feb. 2, 1996
§ 102(e) Date: Feb. 2, 1996
[87] PCT Pub. No.: WO96/02709
PCT Pub. Date: Feb. 1, 1996

[30] Foreign Application Priority Data

Jul. 13, 1994 [SE] Sweden .................. 9402460-1

[51] Int. Cl.[6] ........................ C02F 1/66
[52] U.S. Cl. .................. 210/198.1; 422/277
[58] Field of Search ................ 210/747, 170, 210/198.1, 282, 237; 422/274, 277, 278

[56] References Cited

U.S. PATENT DOCUMENTS 1,517,926  12/1924  Weckesser ............... 422/274
3,519,134  7/1970  Hassinger ............... 210/282
3,581,903  6/1971  Holz ..................... 210/415

*Primary Examiner*—Ivars Cintins
*Attorney, Agent, or Firm*—Young & Thompson

[57] ABSTRACT

A cassette device is disclosed for contribution of neutralizing material into, for example, a surface water flow. The cassette is then intended to be inserted into existing surface water ducts or wells, and comprises an outer, circular, slightly conical wall (2) and an inner circular wall (1) forming a space (5) between the outer and inner circular walls. The space 5 is to be filled with neutralizing material like lime, crushed lime-stone and/or crushed dolomite and/or the like. The cassette is further provided with refill openings (3) to form an exchangeable reusable cassette. Additionally the cassette exhibits inlet orifices (7a) at the inner stepped wall (1) which lead into the space (5), while an outlet from the space (5) takes place through holes (7b) at a bottom rim or ring between the outer and inner walls, whereby the device additionally has a large central opening to handle large flows of fluid.

9 Claims, 2 Drawing Sheets

CASSETTE DEVICE

TECHNICAL FIELD

The present invention relates to a device for neutralizing a flow of fluid, and more exactly to an automatic supply of lime, crushed limestone and/or crushed dolomite and/or other neutralizing materials being placed in a device cassette built into, for example, a surface water well and which may be exchanged at intervals when required.

BACKGROUND OF THE INVENTION

During the last decades it has been obvious that the acidity of rain-water constitutes an environmental problem, which has to be taken care of. Therefore there has been activities to preserve lakes from becoming more acid by treating those with some basic agent like for instance lime, which as powder has been spread out over the surface of the lake by means of a small aircraft or a helicopter. It is however expensive to maintain the proper acidity value (pH) of all the waters of the nature and therefore it is desirable to find further alternatives to this kind of treatments discussed above.

In several countries there are no direct water wells available and the rain-water is collected into large tanks for later use. This water is normally filtered or treated in some way to get rid of contaminations. A German document DE-A1-4 209 429 discloses an installation for pre-treatment, storage and transport of rainwater for use as working water in household, companies and in public buildings and a treatment of the water for this purpose by infiltration or laying on a recipient.

A similar construction but of a more simple form is disclosed in another German document DE-A1-3 812 136. The purpose of the latter device is to make use of rain-water from a drain-pipe for a later usage. Also in this case some treatment like filtering is necessary.

Natural water from drilled or dug wells often do contain residuals of lime as well as natural salts and is therefore not neutral but often somewhat basic and may deviate slightly from a desired value of pH=7.0, whereby the water will then be considered as being "hard". Today there are many devices found on the common market for treating such "hard" water to make it "softer" by particularly removing some of the lime content. On the other hand rain-water is normally "soft" in this respect and when using pure rain-water such a treatment would as a rule not be necessary.

On the other hand there is a desire to treat acid surface water in a way to prevent it from influencing negatively on the environment and making the rivers and lakes more acid. This is the basic problem which has to be taken into account and which problem the present solution as far as possible want to solve according to the present invention.

BRIEF DESCRIPTION OF THE INVENTION

The main object of the present invention is to create an automatic contribution of neutralizing material to a flow of fluid, for instance, to a rain-water flow, whereby this contributed material will accompany the flow upon discharge, and in a case of surface water to rivers and lakes of the environment and thereby contribute to preserving better acidity values of those waters.

According to a first object of the present invention a cassette device is provided, whereby the cassette device comprises an outer, preferably conical and circular, wall as well as an inner, preferably circular, wall forming a space between said outer and inner walls which space, for instance, is filled with lime, crushed lime-stone and/or crushed dolomite and/or other neutralizing materials and the cassette device is further provided with refill openings to form an exchangeable re-usable cassette, the cassette additionally exhibiting inlets in said inner circular wall, and outlets are created by through holes at a bottom rim of the cassette between the outer and inner walls, whereby the device is centrally fully open to handle large flows of fluid.

According to a second object of the present invention a cassette device is provided, wherein each refill opening is provided with a cap or the like for closing the top of the space between the outer and inner walls.

According to a third object of the present invention a cassette device is provided which may be regulated and dosed by adjustment of the inlet orifices in said inner wall, after that the input flow has been determined, for a proper functional contribution of neutralizing material to the flow of fluid before the flow is discharged.

According to a fourth object of the present invention a cassette device is provided, which is adapted to be simply insertable into an existing surface water well or duct by means of a design such that it will be tangent to the inner diameter of the surface water discharge arrangement.

According to a fifth object of the present invention the cassette device is provided with a handling device to make it easily exchangeable when required.

According to a sixth object of the present invention constitutes a cassette device wherein the handling device consists of one or more lifting eye bolts to be able to handle the cassette when exchanging and/or refilling the device.

BRIEF DESCRIPTION OF THE DRAWINGS

The invention will be described in form of a preferred embodiment by making reference to the accompanying drawings, in which the same reference numerals designate the same or corresponding elements.

A PREFERRED EMBODIMENT

Figure 1:
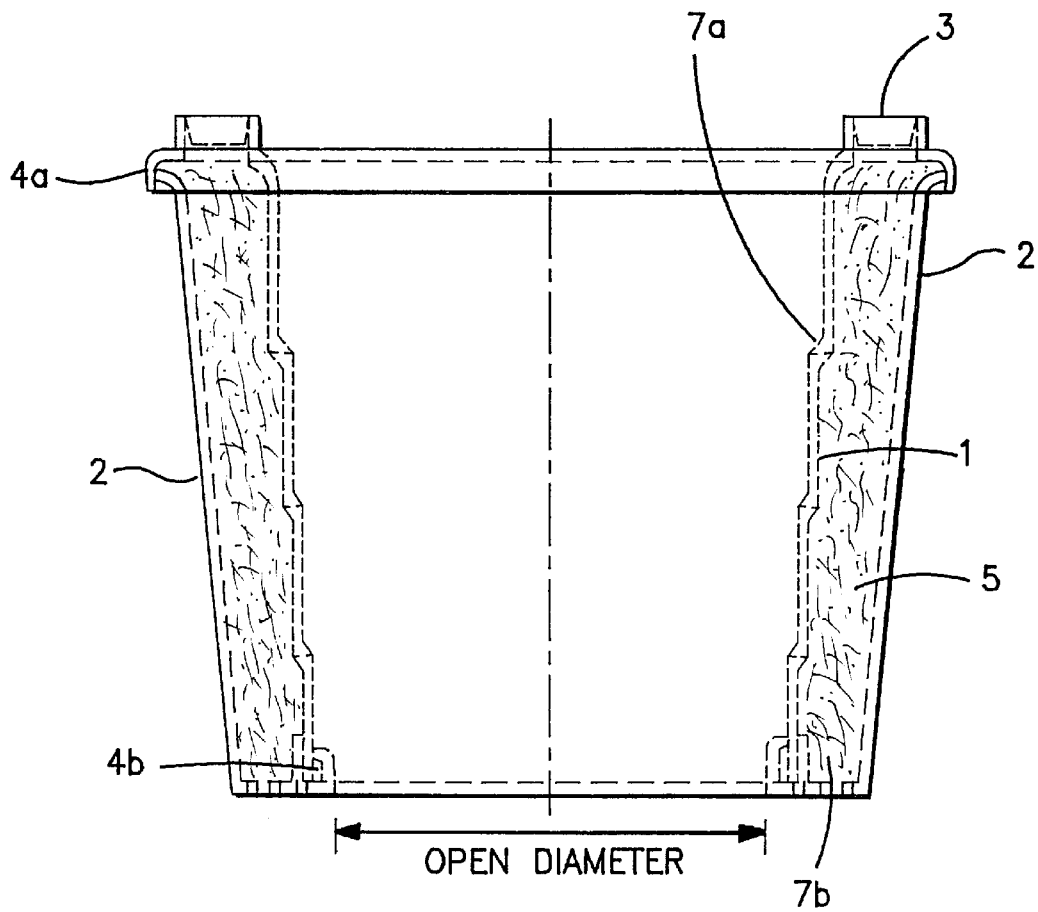
FIG. 1 demonstrates in a preferred embodiment a cassette device according to the present invention.

In FIG. 1 is demonstrated an illustrative embodiment of a cassette device according to the present invention. The device forms a circular, slightly conical, exchangeable cassette, which is intended to be inserted, for example, into existing surface water ducts or wells. The main idea of the embodied invention is to achieve a contribution of for example lime or similar neutralizing material to surface water, which today from acid rain-water may exhibit an acidity different from the desired value of pH=7. By at an early stage neutralizing this acidity and restore the surface water to the desired acidity value, this will improve the total quality of environment water, when the surface water is discharged into rivers and lakes.

The present device forms a, preferably round, cassette which is built from an inner, circular, wall 1 and an outer, circular and slightly conical, wall 2. Between the walls 1 and 2 a space 5 is then created, which will be filled with the desired neutralizing material, for example lime, crushed lime-stone and/or crushed dolomite and/or other neutralizing materials. In the illustrative preferred embodiment the inner wall 1 presents a stepped surface which at the steps is provided with through holes 7a. The number of such through holes in the different steps may by a suitable production technique be selected when the cassette is finally installed into a surface well or the like (also see FIG. 2). The cassette exhibits at the bottom portion an open central large opening, besides a large number of smaller openings 7b around an outer rim or bottom ring. Additionally the cassette is provided with a number of refill openings 3 at an upper rim or top ring for filling the space 5 between the outer and inner walls 1, 2 with the desired neutralizing material or materials. In the preferred embodiment the refill openings are additionally provided with closing caps (not shown) to be able to move a filled device without having the neutralizing material coming out of the space 5 if the cassette should be placed upside down during such a transportation.

Figure 2:
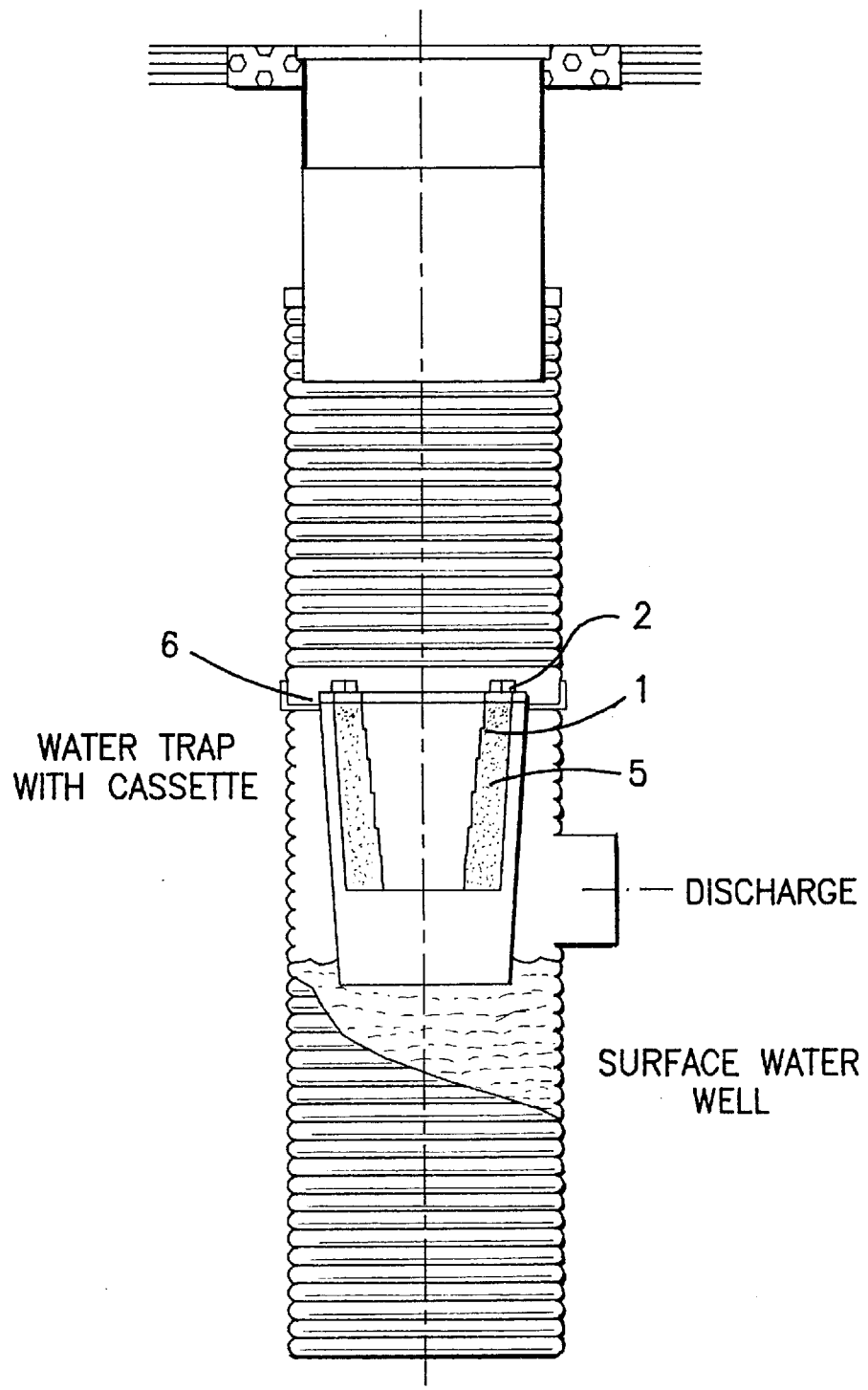
FIG. 2 demonstrates a typical rain-water well having installed a cassette device according to the present invention for neutralizing incoming surface water.

For the desired operation the cassette is inserted into, for instance, a water trap of a surface water well as is illustrated in FIG. 2. The existing well is then provided with a suitable arrangement 6 fitted inside the well, such that it will be sealing the well around its entire perimeter by being tangent to the inner diameter of the surface water well and then forcing water entering the well to flow into the cassette. The cassette in this disclosed arrangement is inserted hanging whereby the entire arrangement will then act as a water trap. With a normal slow flow of surface water into the well, for example during and after a normal rain shower, the water will mainly flow along the stepped inner wall 1 of the cassette. Most of the water will then penetrate through the holes 7a into the space 5 containing the neutralizing material. Some small part of that material will be slowly soaked away and join the water when it emerges through holes 7b in the bottom rim and thereby assisting in neutralizing incoming acid water before it is discharged into rivers and lakes. And at the same time the water of the rivers and the lakes may additionally be improved by a further neutralization of that water.

In the case of a very heavy water flow the water will be discharged from the cassette through the large central opening at the bottom, which will prevent a surface water well provided with the cassette from overflowing in case of a sudden flooding after for example heavy raining.

To adjust the amount of water normally penetrating into the space 5 the cassette may be adjusted by for instance selecting a proper number of holes 7a at each step of the stepped inner wall 1, and thereby regulating the amount of water entering the space 5 and thereby the amount of neutralizing material flowing out with the discharged water.

Due to the simple design of the cassette it will be easily inserted into existing wells and ducts as the arrangement 6 may be altered and modified in numerous ways to adapt the preproduced cassette to existing surface water discharge devices.

The cassette in a preferred embodiment for a surface water well according to FIG. 2 is additionally provided with one or more lifting eye bolts (not shown) to be able to handle the cassette in the surface well upon exchange and/or refill of the cassette according to the present invention.

It will be appreciated by those of ordinary skill in the art that the present invention can be embodied in other specific forms without departing from the spirit or essential character thereof. The presently disclosed embodiment is therefore considered in all respects to be illustrative and not restrictive. The scope of the invention is indicated by the appended claims rather than the foregoing description, and all changes which come within the meaning and range of equivalents thereof are intended to be embraced therein.

I claim:

1. A cassette device for contribution of neutralizing material to a flow of fluid, comprising an outer wall (2) and an inner wall (1) forming a space (5) between said outer (2) and inner (1) walls, said space (5) containing water neutralizing material and further being provided with refill openings (3), whereby the device forms an exchangeable re-usable cassette, said inner wall comprising inlet orifices (7a), and a bottom rim between said outer and inner walls, said bottom rim comprising outlet holes (7b), said device being centrally fully open adjacent said bottom rim to handle large flows of fluid, and said inner wall (1) comprising a stepped surface, each step of said stepped surface comprising said inlet orifices 7(a) to effectively enter said fluid into said space (5).

2. The cassette device according to claim 1, wherein each refill opening (3) is provided with a cap for closing the top of said space (5) between said outer and inner walls.

3. The cassette device according to claim 1, wherein the device may be regulated and dosed by adjustment of said inlet orifices (7a) in said inner wall for controlling the amount of neutralizing material added to said flow of fluid before said flow of fluid is discharged.

4. The cassette device according to claim 1, wherein the device is adapted to be insertable into an existing surface water well or duct such that it will be tangent to the inner diameter of the existing surface water device.

5. The cassette device according to claim 4, wherein said device is provided with at least one handling device.

6. The cassette device according to claim 5, wherein said handling device constitutes at least one lifting eye bolt.

7. The cassette device of claim 1 wherein said outer wall is conical and circular.

8. The cassette device of claim 7 wherein said inner wall is circular.

9. A cassette device for use in contributing neutralizing material to a flow of fluid, comprising an outer wall (2) and an inner wall (1) forming a space (5) between said outer (2) and inner (1) walls, said space (5) adapted to contain neutralizing material and further being provided with refill openings (3), whereby the device forms an exchangeable re-usable cassette, said inner wall comprising inlet orifices (7a), and a bottom rim between said outer and inner walls, said bottom rim comprising outlet holes (7b), said device being centrally fully open adjacent said bottom rim to handle large flows of fluid, and said inner wall (1) comprising a stepped surface, each step of said stepped surface comprising said inlet orifices 7(a) to effectively enter fluid into said space (5).

* * * * *